United States Patent [19]

Rodi et al.

[11] Patent Number: 5,182,803
[45] Date of Patent: Jan. 26, 1993

[54] SYSTEM FOR INPUTTING AND/OR OUTPUTTING SIGNALS OF A DIGITAL CONTROL SYSTEM FOR A PRINTING MACHINE INCLUDING A DIGITAL FILTER

[75] Inventors: Anton Rodi, Leimen; Dieter Hauck, Eberbach; Karl-Heinz May, Viernheim; Hans Müller, Sandhausen, all of Fed. Rep. of Germany

[73] Assignee: Heidelberger Druckmaschinen AG, Heidelberg, Fed. Rep. of Germany

[21] Appl. No.: 668,759

[22] Filed: Mar. 14, 1991

Related U.S. Application Data

[63] Continuation of Ser. No. 132,560, Dec. 14, 1987, abandoned.

[30] Foreign Application Priority Data

Dec. 12, 1986 [DE] Fed. Rep. of Germany ....... 3642500

[51] Int. Cl.[5] .............................................. G06F 15/46
[52] U.S. Cl. ................................... 395/575; 364/140;
364/DIG. 1; 364/222; 364/264; 101/494
[58] Field of Search ... 364/200 MS File, 900 MS File;
371/15.1, 16.1, 24; 395/575

[56] References Cited

U.S. PATENT DOCUMENTS

| | | | |
|---|---|---|---|
| 3,812,472 | 5/1974 | Mahood | 364/200 |
| 4,023,142 | 5/1977 | Woessner | 364/200 |
| 4,155,116 | 5/1979 | Tawfik et al. | 364/579 |
| 4,167,786 | 9/1979 | Miller et al. | 364/493 |
| 4,245,300 | 1/1981 | Kaffman et al. | 364/200 |
| 4,253,148 | 2/1981 | Johnson et al. | 364/200 |
| 4,381,456 | 4/1983 | Santo et al. | 307/40 |
| 4,417,151 | 11/1983 | Klein et al. | 307/24 |
| 4,423,383 | 12/1983 | Svendsen | 328/60 |
| 4,435,706 | 3/1984 | Callan | 340/825.08 |
| 4,479,433 | 10/1984 | MacPhee et al. | 101/364 |
| 4,490,775 | 12/1984 | Quan | 361/406 |
| 4,538,515 | 9/1985 | Tymkewicz et al. | 364/469 |
| 4,561,053 | 12/1985 | Crawford | 364/200 |
| 4,573,130 | 2/1986 | Groult | 364/552 |
| 4,612,445 | 9/1986 | Neri | 340/514 |
| 4,612,638 | 9/1986 | Kissel | 371/15.1 |
| 4,686,655 | 8/1987 | Hyatt | 364/421 |
| 4,955,290 | 9/1990 | Kipphan et al. | 101/183 |

FOREIGN PATENT DOCUMENTS

| | | |
|---|---|---|
| 2743538 | 5/1978 | Fed. Rep. of Germany . |
| 3005872 | 8/1980 | Fed. Rep. of Germany . |
| 3219270 | 11/1983 | Fed. Rep. of Germany . |
| 3347459 | 8/1984 | Fed. Rep. of Germany . |
| 3440025 | 5/1986 | Fed. Rep. of Germany . |
| 3540066 | 5/1986 | Fed. Rep. of Germany . |
| 3510425 | 6/1986 | Fed. Rep. of Germany . |
| 2565378 | 12/1985 | France . |

OTHER PUBLICATIONS

Fed. Rep. of Germany, Publication, "Electronische Rechenaulagen" 20th year, 1978, issue 4, pp. 186–194; article.
"Mikroprosessor Selbsttest" by B. Ebel.
IBM Techn. Disclosure Bulletin vol. 15, No. 1, Jun. 1972, p. 278.
IBM Techn. Disclosure Bulletin vol. 29, No. 7, Dec. 1986, pp. 3210–3211.
IBM Techn. Disclosure Bulletin vol. 27, No. 7B, Dec. 1984, pp. 4529–4530.
Fed. Rep. of Germany publication "Elektroanik" 20, Oct. 7, 1983, Spec. Publication Coun & Pro., article "Habere Znverlassigheit für Microcompter" pp. 153–157; whole article pertinent.
Patent Abstracts of Japan, vol. 11, No. 334 (P-631) (2781) Oct. 31, 1987 & JP-A-62 115548 (Toshiba Corp.) May 27, 1987.

*Primary Examiner*—Lawrence E. Anderson
*Attorney, Agent, or Firm*—Herbert L. Lerner; Laurence A. Greenberg

[57] ABSTRACT

Monitoring system for an electronic digital system. It includes an electronic digital control unit, a plurality of peripheral units, a bus system, the various system parts, and further an output circuit connected to the control unit. It further includes an output stage circuit with inputs connected to the output circuit, and outputs transmitting signals to the peripheral units for interrogating fault conditions therein, an interrupt trigger circuit with outputs connected to the control unit, and a digital filter connected between the monitoring system and the peripheral units for filtering out noise signals from the peripheral units.

12 Claims, 10 Drawing Sheets

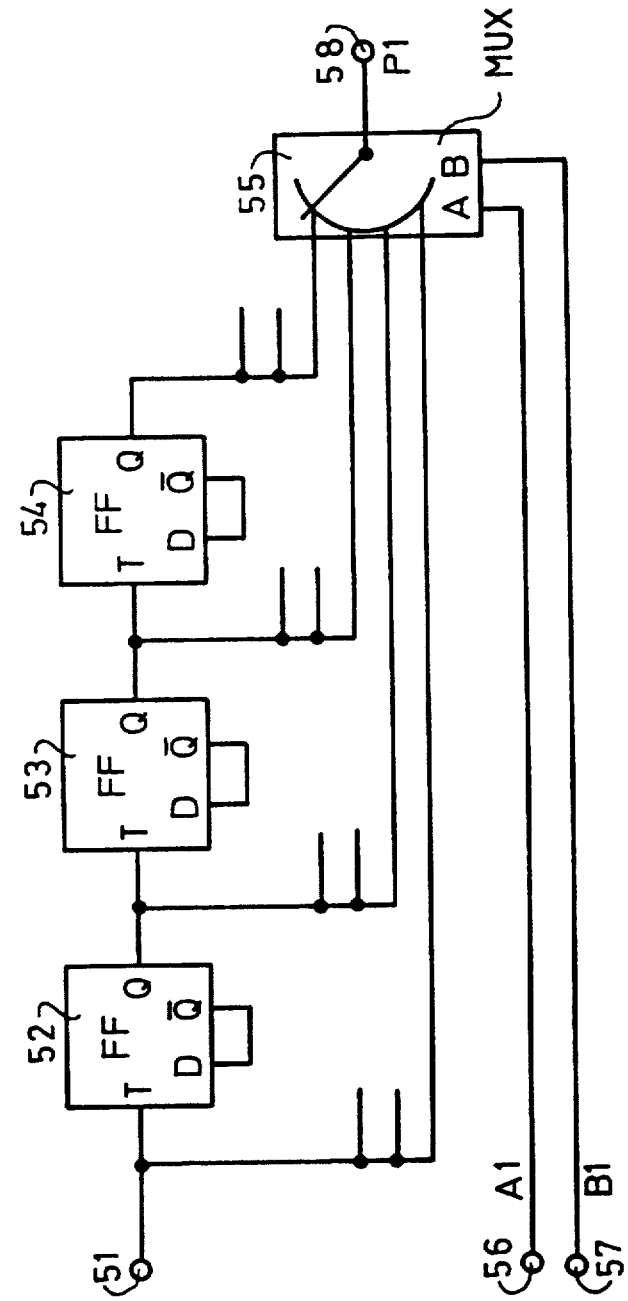

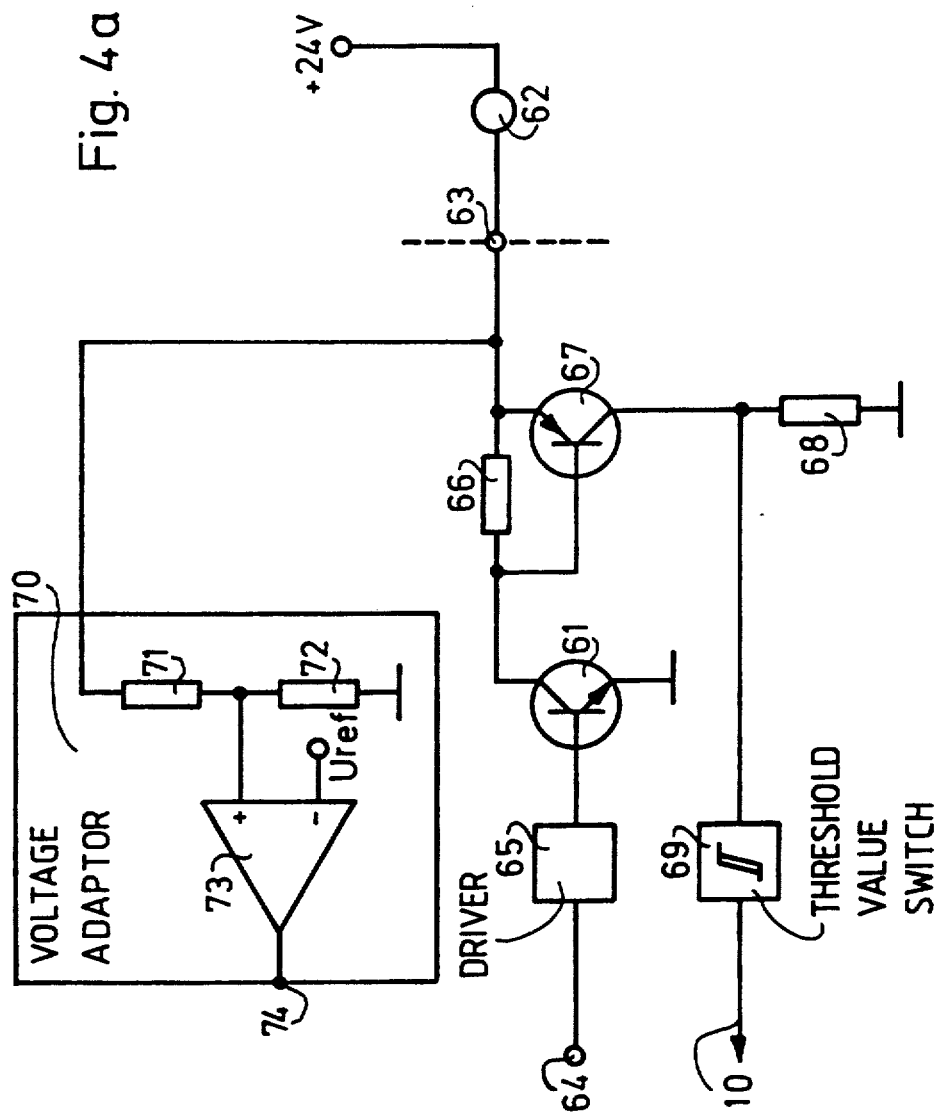

1

SYSTEM FOR INPUTTING AND/OR OUTPUTTING SIGNALS OF A DIGITAL CONTROL SYSTEM FOR A PRINTING MACHINE INCLUDING A DIGITAL FILTER

This application is a continuation of application Ser. No. 132,560, filed Dec. 14, 1987, now abandoned.

BACKGROUND OF THE INVENTION

Description of the Related Art

The invention relates to a system for outputting signals of a digital control system to peripheral units and, more particularly, to a system for inputting and/or outputting such signals to peripheral units which are connected via a bus system, output registers and output stages to a control unit.

The invention relates further to a system for inputting and/or outputting signals of a digital control system from and/or to peripheral units, wherein an output side of an input circuit and an input side of an output circuit are connected to a control unit, and wherein the input and/or output circuits are monitored.

The control of machines and installations with the aid of digital control functions frequently also includes functions in which errors can lead to considerable material damage or even risks to persons. Especially in the case of complex structures, therefore, very great demands are placed upon the reliability of individual system components. It is necessary, therefore, when switching-on or during the operation of an installation to realize an error diagnosis in order to detect errors quickly and to bring them under control with regard to safety.

Monitoring is necessary, particularly in the vicinity of the peripheral units and interfaces.

These demands apply particularly to systems for the control of printing presses, because, in such a case, firstly, the number of sensors and actuators is very high and their operation has to be adapted to the specific requirements. Secondly, personnel trained in the field of electronics is often not available for the operation of printing presses It is accordingly an object of the invention of the instant application to provide a system for inputting and/or outputting signals of a digital control system which permits such monitoring in a reliable manner yet maintains the associated expense as low as possible. In this connection, it is a further object of the invention to provide the system according to the invention with a high degree of flexibility.

SUMMARY OF THE INVENTION

With the foregoing and other objects in view, there is provided, in accordance with the invention, a system for outputting signals of a digital control system to peripheral units connected via a bus system, output registers and output stages to a control unit, comprising means for separately interrogating contents of the output registers and output signals of the output stages.

Due to the measures according to the invention, it is possible not only to monitor the output circuits, but also to detect errors or faults in the peripheral units, such as indicator lamps, electro-mechanical actuators, relays or switches Furthermore, fault or failure messages can be outputted if faults occur on the wiring. Thus, the invention contributes towards considerably increasing the proportion of errors within the overall system, for example a printing press or its digital control system, which can be detected by a corresponding monitoring program or error-diagnosis program.

In this connection, in accordance with another feature of the invention, there are provided means for interrogating the output signals of the output stages via different addresses than the contents of the output registers.

Moreover, in accordance with a further feature of the invention, there are provided different data lines by which the output signals of the output stages are interrogatable than the contents of the input registers.

In accordance with an additional feature of the invention, there is provided a respective number of the output registers which conform to the width of the bus system and are combined together to form a output circuit.

In accordance with an added feature of the invention, the output stages have an output respectively formed by a transistor, having a collector with a load resistance formed exclusively of the respective peripheral unit.

In larger installations in which, for example, several machines with digital control systems are connected together, it may be necessary for the outputs of the digital control system to be adapted to sensors or loads which, with their connection facing away from the output of the digital control system, are connected either to ground or frame potential or to an operating voltage.

In this regard, in accordance with yet another feature of the invention, the output stages have an output respectively formed with two transistors serially connected and being drivable so that, respectively, the one transistor, the other transistor and both transistors are in a non-conducting state.

In order to detect short circuits, in accordance with yet a further feature of the invention, the output stages comprise devices for detecting output current.

In a particularly advantageous embodiment of the invention, outputs may be used also as inputs, without requiring a modification of the circuitry as such. For this purpose, an input circuit for several parallel signals is provided, the inputs of which are connected to the outputs of the output stages. Thus, in accordance with yet an added feature of the invention, the system includes input registers for interrogating the output signals, the input registers having respective inputs and outputs which are connected to the outputs of the output stages and to the bus system, respectively.

Because, the loads or sensors usually operate at higher voltages than can be withstood by the digital modules, there are provided, in accordance with another feature of the invention, adapter circuits preconnected to the input registers.

In order to prevent incorrect inputs as a result of contact bounce or possible pulse noise, the system is provided, in accordance with a further feature of the invention, with a digital filter respectively disposed between the adapter circuits and the input registers.

In accordance with an additional feature of the invention, the outputs of the output stages are constructed as input/outputs, each of the input/outputs being individually definable as an input or an output through activation via the output circuit and through the nature of the connected peripheral unit. This makes it possible for inputs/outputs of the system to be occupied entirely as desired with loads or sensors, adaptation or matching being performed merely by suitable programming.

In accordance with an added feature of the invention, the peripheral units, respectively, have two connections, and respectively, one of the connections is to one of the input/outputs and the other of the connections is to a reference potential, the reference potential being applied a a control to a further input of the adapter circuit. Thus, the adapter circuit is able to receive signals coming from sensors having connections facing away from the adapter circuit which are in contact with ground or frame potential, or from sensors in which this connection is connected to an operating voltage.

Similar flexibility is achieved in the case of loads, in accordance with still another feature of the invention, wherein the output stages have two series-connected transistors, and means are provided for controlling the respective output stages as a function of the reference potential so that one of the transistors is driven, the transistor having a connection facing away from the output and having a voltage different from the reference potential applied thereto.

In accordance with still a further aspect of the invention, there is provided a system for inputting and/or outputting signals of a digital control system, from and-/or to peripheral units, wherein an output side of an input circuit and an input side of an output circuit are connected to a control unit, comprising means for monitoring at least one of the input and output circuits, and a test-pattern register via which test signals are introducible to inputs of the input circuit by the control unit, the control unit having means for comparing output signals of the input circuit with the test signals. These measures may be applied advantageously when the input/outputs are used as either inputs or outputs.

In accordance with still an additional feature of the invention, the input circuit and the test-pattern register are respectively provided for a plurality of parallel signals forming a multi-bit data word, and means for forming a test pattern, wherein, consecutively, individual bits assume, after a first value, a second value and then again the first value. This "pushing-through" of a bit that differs from the preceding and following bits makes it possible, in an advantageous manner, for errors to be reported even when two or the eight parallel channels of the digital filter and of the input circuit, respectively, are connected together by a defect.

In accordance with still an added feature of the invention, the input circuit comprises means for comparing consecutive values of a respective bit, the means being connected to a circuit for triggering an interruption of a program run.

In accordance with still another feature of the invention, the system includes monitoring devices connected to outputs having signals which depend not only on values to be outputted, but also on properties of the peripheral units connected to the outputs.

In accordance with a further aspect of the invention, there is provided a system for inputting and/or outputting signals of a digital control system from and/or to peripheral units, wherein an output side of an input circuit and an input side of an output circuit are connected to a control unit, comprising means for monitoring at least one of the input and the output circuits, the output circuit having gates for affording a linkage of supplied signals with pulse signals. To draw special attention, indicator lamps which perform safety functions are frequently operated in an intermittent or pulsating mode, with the result that the indicator or control lamps flash. This may be done in a relatively simple manner by means of suitable commands in the computer program, which, firstly, has the disadvantage that, if several lamps are arranged on a control panel, the different timing with which the computer switches the lamps on and off results in a confusing picture. Secondly, devices of the control unit and of the data bus are repeatedly used or stressed during flashing. The aforementioned embodiment of the invention eliminates these disadvantages.

In accordance with an additional feature of the invention, the output circuit is provided for a plurality of parallel signals, and there are provided means for producing the pulse signals by frequency division of a supplied pulse clock signal, a division ratio being settable for each of the parallel signals independently of one another.

In accordance with a further feature of the invention, the system includes a multiplexer for setting the division ratio for each parallel signal, the multiplexer connecting one of a plurality of outputs of a frequency divider to a gate in the output circuit as a function of control signals supplied thereto, and a control-word register connected to the input side to the control unit for supplying the control signals. Thus, for each of the connected indicator lamps, once or each time a signal is transmitted to effect energization of the indicator lamp, a corresponding control signal can be introduced into the input and-/or output system according to the invention, that signal containing data as to whether the indicator lamp in question is to flash and, if necessary, at what frequency.

Particularly for multi-computer systems in which one computer drives some bits in the output circuit but is not supposed to change the value of the other bits which have been previously specified by another computer, there is provided, in accordance with yet another feature of the invention, a system wherein the output circuit includes devices for reading values stored in the output circuit via the control unit.

In order that error messages and, if necessary, also results of test operations in general can be reported as quickly as possible to the control unit, there is provided, in accordance with the invention, that the output circuit include two multiple registers having data inputs connected bitwise in parallel to a data bus, and having data-transfer inputs controllable separately by the control unit, the multiple registers having outputs for output signals gated bitwise with one another and with a pulse signal, respectively.

In this connection, individual signals supplied to the inputs may be disabled as a function of the contents of a control-word register. This makes it possible, by suitable programming, for individual signals representing error messages, which would thus trigger an interrupt, not to cause the triggering of an interrupt, but to be evaluated only when interrogated by the program via the data bus of the control unit.

In accordance with another aspect of the invention, therefore, the system for inputting and/or outputting signals of a digital control system from and/or to peripheral units, wherein an output side of an input circuit and an input side of an output circuit are connected to a control unit, comprises means for monitoring at least one of the input and the output circuits, the control unit having a circuit for triggering an interruption of a program run, the triggering circuit having inputs via which a plurality of parallel signals from the input circuit, and current-detecting signals from output stages are capable of being fed.

In accordance with another feature of the invention, the circuit for triggering an interruption has an output connected to the control unit, the output of the triggering circuit supplying an interrupt signal if a signal occurs at least at one of a plurality of inputs, a register bit being provided for each of the inputs, the register bit having a content which is interrogatable by the control unit.

In accordance with a further feature of the invention, the system includes means for disabling individual signals supplied to the inputs as a function of the contents of a control-word register.

In accordance with an additional feature of the invention, the circuit for triggering an interruption of the program run has an output connected to the control unit, the output, upon an occurrence of a signal at one of the inputs, being capable of delivering a data word having a content identifying the respective input.

To prevent malfunctions through contact bounce and through possible pulse noise, in accordance with an added feature of the invention, there is provided, a system for inputting and/or outputting signals of a digital control system from and/or to peripheral units, wherein an output side of an input circuit and an input side of an output circuit are connected to a control unit, comprising means for monitoring at least one of the input and output circuits, an adapter circuit and a digital filter, respectively, for a plurality of parallel signals, disposed between inputs connected to the peripheral units, and an input circuit for a plurality of parallel signals, filtering by the filter occurring over a plurality of periods of a supplied clock signal.

In accordance with a concomitant feature of the invention, the number of periods are settable as a function of the contents of a control-word register Other features which are considered as characteristic for the invention are set forth in the appended claims Although the invention is illustrated and described herein as embodied in a system for inputting and/or outputting signals of a digital control system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

BRIEF DESCRIPTION OF THE FIGURES

FIG. 3 is a circuit diagram of a pulse frequency divider forming part of the system;

FIGS. 4a and 4b circuit diagrams of two specimen embodiments of an output stage both with an adapter circuit forming part of the system;

DESCRIPTION OF THE PREFERRED EMBODIMENTS

Figure 1:
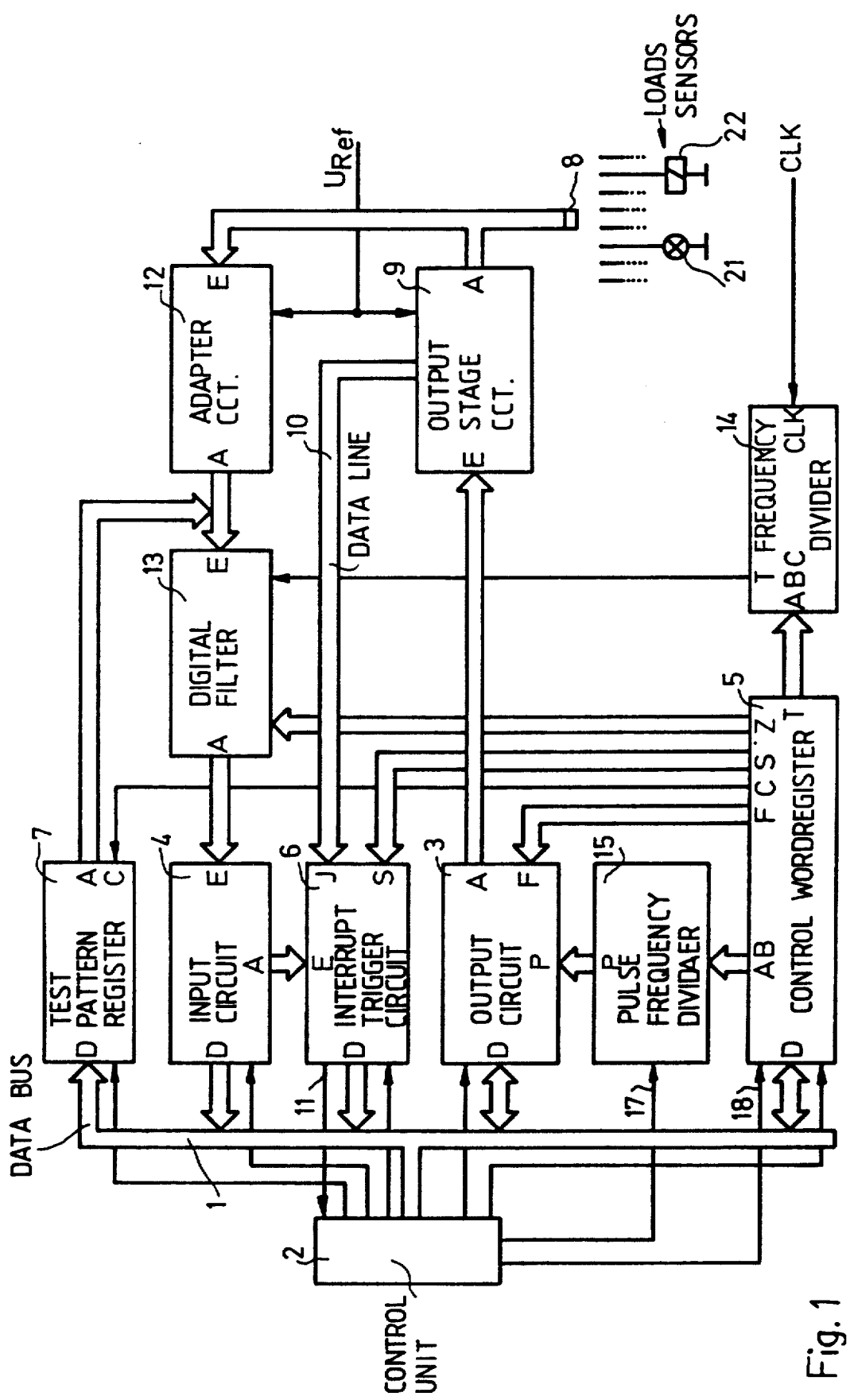
FIG. 1 is a block diagram of a signal input and/or output system for a digital control system according to the invention.

Referring now to the figures of the drawing, it is noted that the circuits shown in FIGS. 2 to 9 form the most important components of the system illustrated in FIG. 1. The circuits are designed in each case for eight parallel signals With few exceptions, FIGS. 2 to 9 merely show switching operations for one of the eight parallel signals. Identical components in the figures are provided with identical reference numbers.

FIG. 1 is a block diagram of an input/output system according to the invention which is part of a digital control system. The digital control system may include more than one of the input/output systems shown in FIG. 1 and one or more microprocessors as well as memories and other components. To explain the invention only a data bus 1 and a control unit 2 of all the other components of the digital control system are shown.

An output circuit 3, an input circuit 4, a control word-register 5, a circuit 6 for triggering an interrupt of the program run and a test-pattern register 7 are connected to the data bus 1. These peripheral units are also connected to the control unit via control lines, only one of which is indicated in each case in FIG. 1. It is also possible to provide an address and control bus for the signals transmitted therewith. In the peripheral illustrated embodiment of the invention, the units 3 to 7 and the data bus 1 are each designed for a width of 8 bits.

Signals which are finally to be sent to loads 21 and 22 via an input/output 8 are supplied via the data bus 1 to an output circuit 3. Individual bits of the eight-bit-wide input/output 8 can be set as an input or output by a program. In larger systems, however, it will be preferable to operate one or more of the circuits shown in FIG. 1 as output circuits and others as input circuits.

With regard to the control of machines and plants, the loads 21 and 22 that are to be connected to the input/outputs will primarily be indicator lamps and magnetically operated actuators. With such machines and plants, it has proved to be advantageous to show particularly important signals by flashing indicator lamps. The flashing of several indicator lamps, which are controlled by a microprocessor, results in a very confusing picture, however, because the timing of the flashing of all of the indicator lamps varies in accordance with the prescribed program.

For this reason, in a further development of the invention, linking of the signals with flashing signals that can be generated separately for each bit of the data word supplied to the output circuit 3 is provided in the output circuit 3. In this, a control word is supplied via the data bus 1 to a control word-register 5, the control word indicating, among other things, which bits of the data word to be sent via the output circuit 3 are to flash. In this connection, it is also possible for various bits to flash at different frequencies. Further details in this regard will be explained later in conjunction with a description of FIGS. 2 and 3.

The output signals of the output circuit 3 are fed to an eight-bit output stage circuit 9, further details of which are described in conjunction with FIG. 4. The output-stage circuit 9 is short-circuit-proof and is provided with a circuit for measuring the output current. The outputs of the output-stage circuit 9 form the output of the input/output 8. If a predetermined output current is exceeded, the interrupt trigger circuit 6 for triggering an interrupt of the program (interrupt triggering) is activated via a data line 10. The circuit 6 is connected via a line 11 directly to the control unit 2 of the digital control system, where the program currently being executed is interrupted in order to change over to an error-diagnosis program.

Output signals and/or input signals to be monitored, those signals coming from sensors, for example limit switches or emergency-stop switches, are sent from the input/output 8 to an adapter circuit 12. The primary task of this circuit is to adapt the levels of the input signals, which may have been sent over long lines, to the level of the digital system, for example TTL. In this connection, it is possible, to a certain extent, for noise interference superimposed by threshold-value characteristics to be suppressed and, through the use of differential amplifiers, for signals that have been transmitted symmetrically on two lines from the sensor to the adapter circuit 12 to be further transmitted on one line.

Furthermore, an embodiment of the adapter circuit 12 has a special feature which is that a reference potential is supplied to it. Terminals of the sensors facing away from the input/outputs 8 are connected to this reference potential. Depending upon whether this reference potential corresponds to an operating voltage of +24 V, for example, or to ground potential, such an adaption takes place in the adapter circuit 12 so that, at the outputs of the adapter circuit 12, the corresponding logic level is always assigned to a predetermined circuit state of the sensor.

The output signals from the adapter circuit 12 are fed to a digital filter 13, which suppresses signals that are so short that they cannot be "genuine" signals from a sensor. To adapt the digital filter 13 to the respective sensor, both the frequency of the clock signal and also the number of clock pulses for filtering are controlled. Once again, control is effected via the control word-register 5, which, first, provides the number of clock pulses and, second, supplies a divider value to a frequency divider 14.

The signals which have passed the digital filter 13 are fed via the input circuit 4 to the data bus system 1 and to the interrupt-triggering circuit 6. To monitor the digital filter 13 and the input circuit 4, signals representing a test pattern are fed from the data bus system 1 via the test-pattern register 7 to the input of the digital filter 13.

If the system is used for output, the signals that are to be sent on to the loads 21 and 22 are each sent as one bit of an eight-bit word via the data bus system 1, the output circuit 3 and the output-stage circuit 9 to the output. Some of them are pulsed, for which purpose the necessary pulses are fed to the output circuit 3 via the control-word register 5 and a pulse frequency divider 15. If a load is switched off, 24 V are applied to the corresponding terminal of the input/output 8 while, if the load is on, 0 V are present. This information is supplied via the adapter circuit 12 and the digital filter 13 to the input circuit 4, from which it can be interrogated, when desired, by the control unit via the bus system 1, so that it is possible to monitor regularly whether the desired voltages are present at the input/output 8.

Errors which are caused, for example, by the output circuit 3, the output-stage circuit 9 or by the appertaining load, are detected. To ensure that a corresponding error indication or other suitable measures do not occur only if the input circuit 4 is interrogated within the course of the normal operation of the program, the input circuit 4 is connected to the interrupt-triggering circuit 6. In addition, there is a direct report from the output-stage circuit 9, if a short circuit, i.e. an excessively high output current, is taken from one of the end stages.

In addition, the digital filter 13 and the input circuit 4 are checked regularly by the connection of a test pattern to the inputs of the digital filter 13, for example, whenever the control system is started up. Thus, if the input/output system is operated as an output, it is possible to differentiate whether, in the case of an error occurring in the loop formed by the output circuit 3, the output-stage circuit 9, the adapter circuit 12, the digital filter 13 and the input circuit 4, the path for the output signals and/or the path for the input signals is defective.

To operate the system shown in FIG. 1 for inputting, sensors, preferably switches, are connected to the terminals of the input/output 8. No output signals are supplied via the output circuit 3, and the input signals from the sensors are, as described hereinbefore in conjunction with the checking of the output signals, supplied via the adapter circuit 12, the digital filter 13 and the input circuit 4 to the bus system 1.

The operating principle of the system shown in FIG. 1 is explained hereinbelow with reference to the details presented in FIGS. 2 to 8. The output of signals, the further transmission of input signals, the checking of the system as well as the triggering of an interrupt are described in the following individual sections.

Output of Signals

Figure 2:
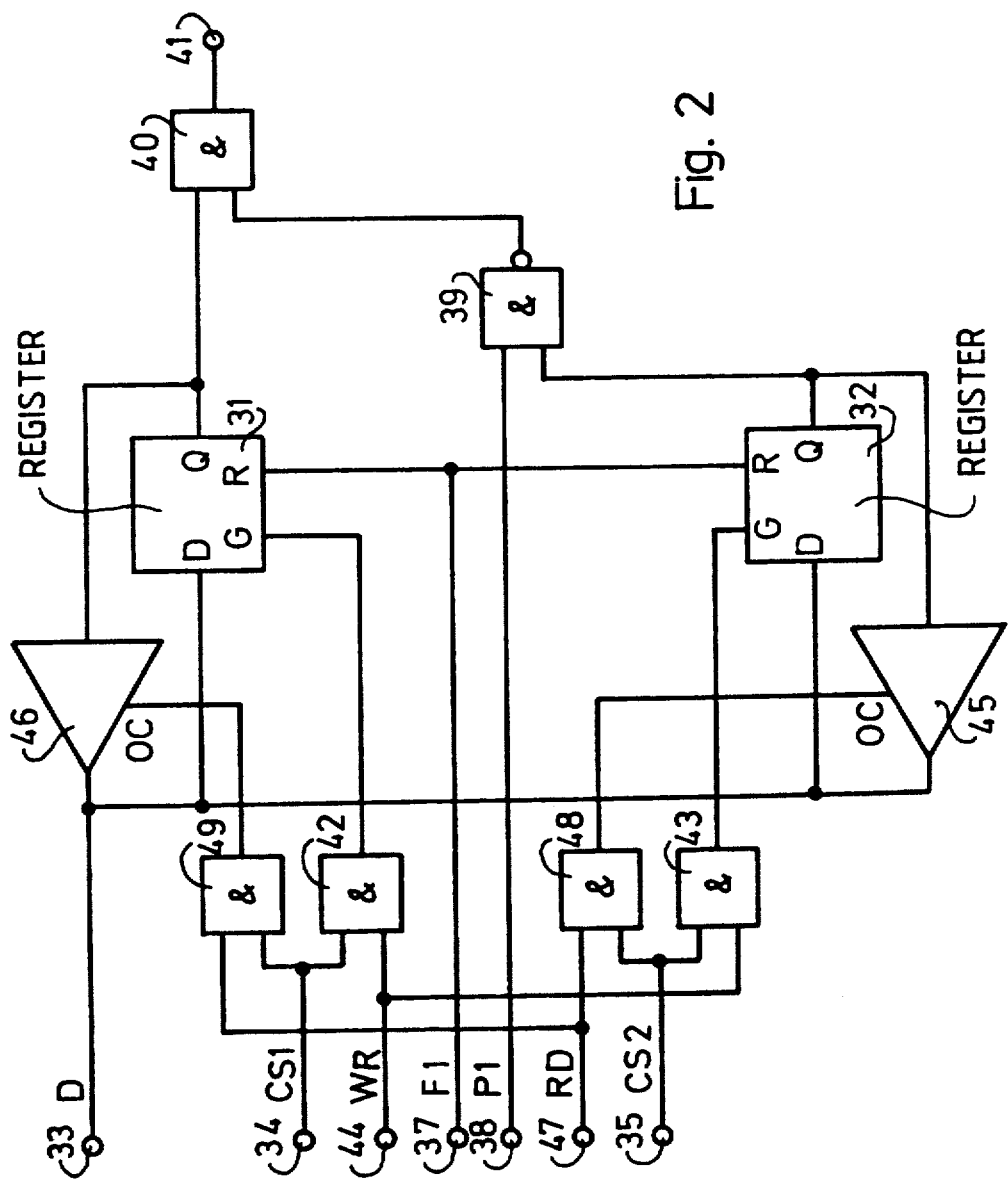
FIG. 2 is a circuit diagram of an output circuit forming part of the system.

From the control unit 2, eight signals are sent in parallel via the data bus 1 to the output circuit 3 for driving eight loads. Only two of the eight loads are shown, namely an electric bulb 21 and a relay winding 22. In FIG. 2, only one of eight parallel channels of the output circuit 3 is shown. Data inputs D of two registers 31 and 32 are connected to the data bus 1 via a connection 33 (FIG. 1). Via further inputs 34 and 35, signals CS1 and CS2 are supplied from the control unit 2 and can be used, respectively, for one data word in each case, to energize the registers 31 or the registers 32 to accept the input signals D. An enabling signal Fl is supplied, likewise from the control unit 2, via a further input 37. Furthermore, for each of the parallel channels, an input 38 is provided for a pulse signal P1 which, together with the output signal of the register 32, is fed to a NOT-AND circuit 39, which in turn, together with the output of the register 31, is connected to an AND circuit 40. From the output 41, the respective signal is fed to the output-stage circuit 9 (FIG. 1).

The seek signals CS1 and CS2 are fed to the G-inputs of the registers 31 and 32 via AND circuits 42 and 43, to which a write pulse WR is additionally supplied via an input 44 if data are to be written into the registers 31 and 32. The data stored in the registers 31 and 32 can, however, also be read via the data bus 1 (FIG. 1). For this purpose, tristate drivers 45 and 46 are connected to the outputs Q of the registers 31 and 32; and have outputs which are connected via the respective connection 33 to the data bus. If the contents of one of the registers 31 and 32, respectively, is to be read, a read pulse RD is supplied via an input 47 to the two AND circuits 48 and 49, whereupon the corresponding seek pulse CS1 or CS2 is sent to the output-control connection OC of the respective tristate drive 45 or 46.

This reading-out of the contents of the registers 31 and 32 is particularly advantageous if the control unit has several computers. It may happen in this connection that one computer is responsible for driving an output circuit, with some of the parallel output signals being accepted and others being changed according to the program of the receiving computer. The receiving computer is then able to read the register content in order then to transmit via the data bus a new data word in which the corresponding bits are unchanged.

If the output 41 is to be off, a logic 0 is stored in the register 31. The state of the register 32 is then without significance. If the output 41 is supposed to be on permanently, a logic 1 is stored in the register 31, and a logic 0 in the register 32. This logic 0 always produces a logic 1 at the output of the NOT-AND circuit, and the logic, together with the output of the register 31, always switches on the output 41 via the AND circuit 40. If an output signal is to be pulsed, in order, for example, to make a warning lamp flash, a pulse signal P1 supplied via the input 38 is fed via the NOT-AND circuit 39 through the register 32 (set of logic 1) to the AND circuit 40. Together with the register 31 (set to logic 1), a pulsed driving signal for the output circuit 9 is produced via the AND circuit 40 at the output 41.

FIG. 3 shows a block diagram of the pulse frequency divider 15, to which a pulse clock signal is supplied at 51. The frequency of this pulse clock signal corresponds to the highest required pulsing and flashing frequency, respectively, of an indicator lamp. Flip-flops 52, 53 and 54 form a frequency-divider chain. Both the input 51 and the outputs of the flip-flops 52, 53 and 54 are connected to inputs of eight multiplexers, respectively, of which only one multiplexer 55 is shown in FIG. 3.

Via further inputs 56 and 57, a two-bit-wide control word is supplied to the multiplexer 55 from the control-word register 5 (FIG. 1). Other similar 2-bit control-word inputs are connected to the non-illustrated multiplexers. Depending upon the control word, the output 58 of the multiplexer 55 is connected to one of the multiplexer inputs, so that the respective pulsing or flashing frequency can be varied in each case by a factor of 2.

FIGS. 4a and b show two embodiments of output stages, of which eight are provided in each case in the output-stage circuit 9 (FIG. 1). In the output stage shown in FIG. 4a, there is provided a transistor 61, which, apart from the load 62, does not have any load resistance. The output 63, therefore, represents a so-called open-collector output. From the output circuit 3 (FIG. 1), the signal is sent to the input 64 of the output stage shown in FIG. 4a and is supplied via a drive 65 (shown only diagrammatically) to the base of the transistor 61. A current measuring resistor 66 is connected in series with the collector-emitter circuit of the transistor 61 and is bypassed by the base-emitter circuit of a further transistor 67. In the case of a short circuit in the load 62, the voltage drop across the resistor 66 becomes so great that the further transistor 67 starts to conduct and there is a drop in voltage across the resistor 68, that voltage being transmitted via a threshold-value switch 69 and one of the leads 10 (FIG. 1) to the interrupt-triggering circuit 6. Via this circuit, it is possible for the output circuit to be driven in such a way that the output stage becomes de-energized.

For various reasons, for example because of lengthy lines between the entire electronic control system and the individual loads, an operating voltage of +24 V is usually provided for the loads. It is possible, however, also to use other voltages. To check the output circuit, therefore, an adaptation to the digital circuit which are used, for example TTL circuits, is necessary. This purpose is served by the adapter circuit 12 (FIG. 1), of which there is shown in FIG. 4a the circuit 70 for one of eight bits.

Adaptation is performed basically by a voltage divider 71, 72, to which a comparator 73 or a threshold-value switch is connected. The output 74 of the comparator is connected to a digital filter 13 (FIG. 1), which is described in greater detail hereinafter in conjunction with FIG. 6. From the digital filter, the signals are fed to the input circuit 4 (FIG. 1) and can be read by the control unit 2 via the data bus 1.

In the system according to the invention, it is possible to detect the following defects on the path of the signals (for driving the loads) between the control unit 2 and the respective load 62:

1. An open circuit between the control unit and the transistor 61 in the output stage, in spite of different signals supplied from the control unit, does not cause any change in the signals read out from the input circuit 4 (FIG. 1).
2. In the case of an open circuit in the lead between the output 63 and the load 62 and the further lead to the operating-voltage source, respectively, the output 63 is always connected to ground potential.

Figure 4B:
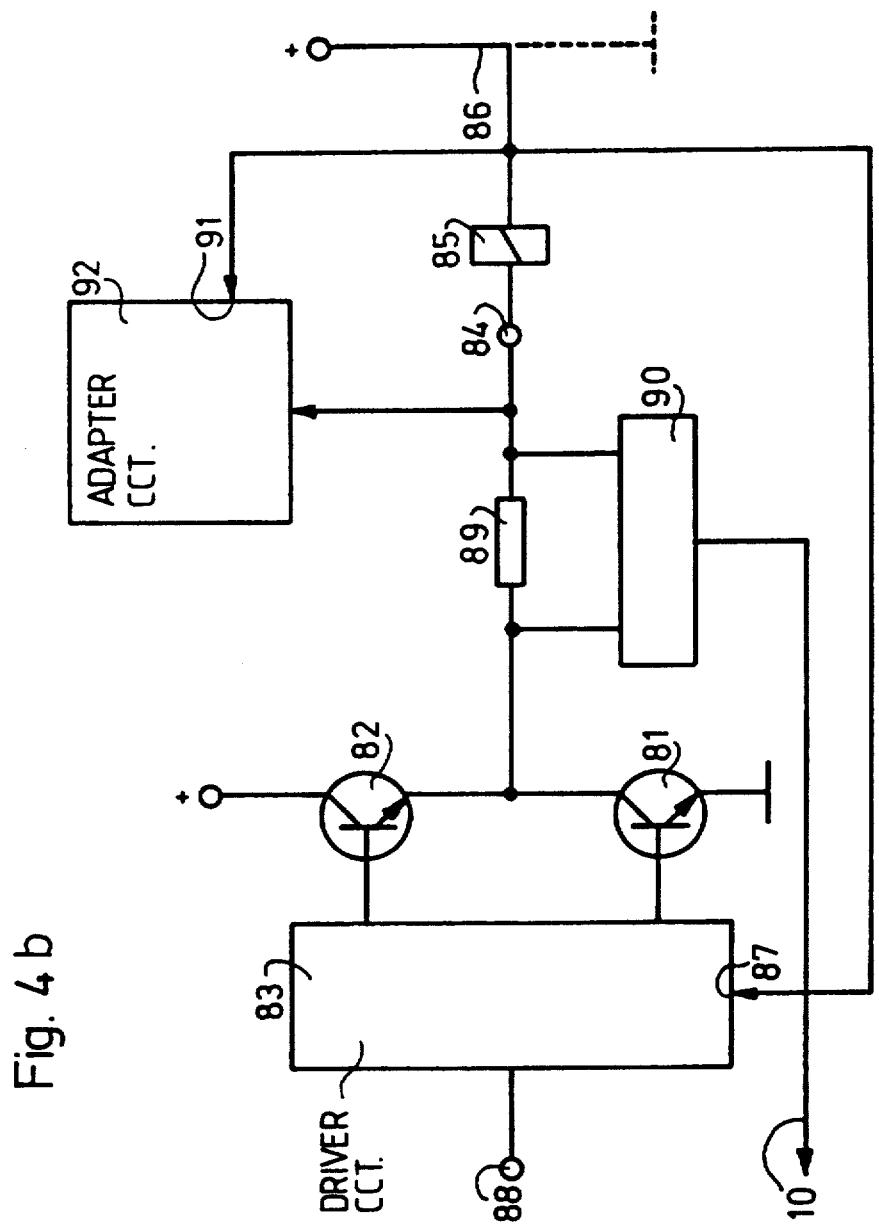

A further embodiment of the invention which permits loads with the same output stage to be connected by the terminal thereof facing away from the output either to a positive operating voltage or to ground potential is described in conjunction with FIG. 4b. This may be advantageous particularly if a digital control system with the input/output system according to the invention is connected to printing presses in which loads, including the wiring, are already present. Also, if several printing presses or printing-press components are controlled by a digital control system, it is possible for loads and sensors or transmitters to be connected to different potentials.

With the output stage according to FIG. 4b, two series-connected transistors 82 and 81 form the output stage together with a driver circuit 83 (shown only as a block). The transistors can be driven in such a way that the output 84 forms a so-called tristate output. In this connection, the output 84 has a high resistivity, i.e. both transistors 81 and 82 are non-conducting when no voltage is supplied to a load 85 which, in the case of FIG. 4b, is represented as a relay winding. The connection 86 of the load 85 facing away from the output 84 is connected to a control input 87 of the driver circuit 83. This means that, when a positive voltage is present at the connection 86, the transistor 81 is controlled by the signals applied to the input 88 of the output stage. If, however, as indicated by the broken line in FIG. 4b, the connection 86 is connected to ground or frame potential, the driver circuit 83 is switched over to the transistor 82, with the result that the latter is controlled by the signals supplied at 88. With the adapter circuit 92 shown diagrammatically in FIG. 4b, account is likewise taken of whether the load 85 is connected to positive potential or to ground or frame potential, for which purpose the reference potential is fed to a control input 91 of the adapter circuit 92.

Further Transmission of Input Signals

Figure 5:
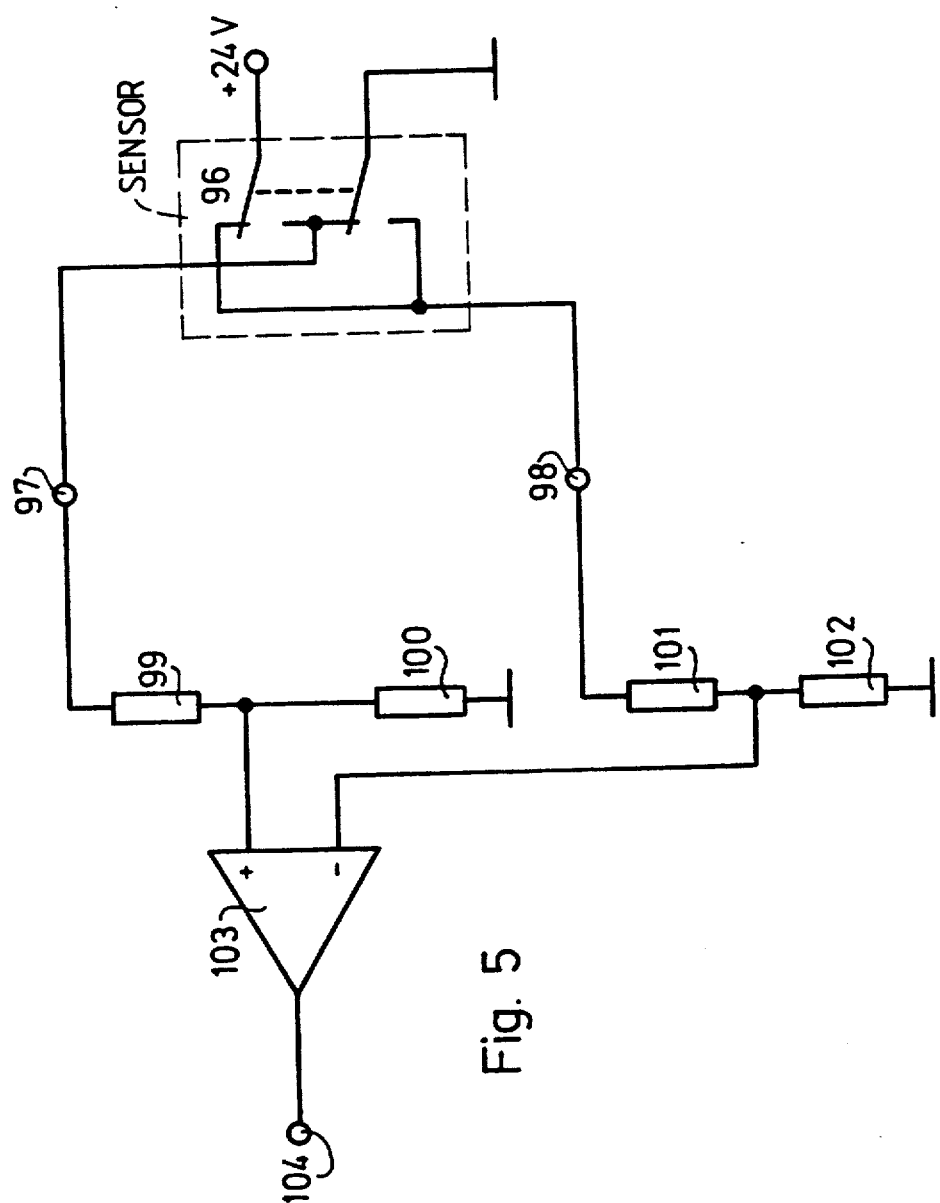
FIG. 5 is a circuit diagram of another specimen embodiment of an adapter circuit forming part of the system.

The following explanatory remarks refer to the further transmission of input signals via the adapter circuit 12, the digital filter 13 and the input circuit 4. In this connection, the input signals may originate from sensors, for example switches, which are disposed on the machine being controlled. However, they may also be output signals from the output stage 9 that are to be checked. Whereas FIG. 4a shows a first embodiment of an adapter circuit in conjunction with an output stage, FIG. 5 shows a second embodiment of an adapter circuit, to which input signals are fed from a sensor 96 via two leads to a differential input. The latter may be advantageous particularly in the case of sensors which perform safety-relevant and rapid functions.

The sensor 96 is a so-called polarity-reversing switch and is connected with its wipers alternatingly to ground or frame potential and +24 V, so that the wires leading to the inputs 97 and 98 can be connected alternatingly to ground or frame potential and +24 V. The inputs 97 and 98 are connected, via a respective voltage divider 99, 100; 101, 102 to a noninverting and an inverting input of a differential amplifier 103 having an output 104 which forms an output of the adapter circuit.

Figure 6:
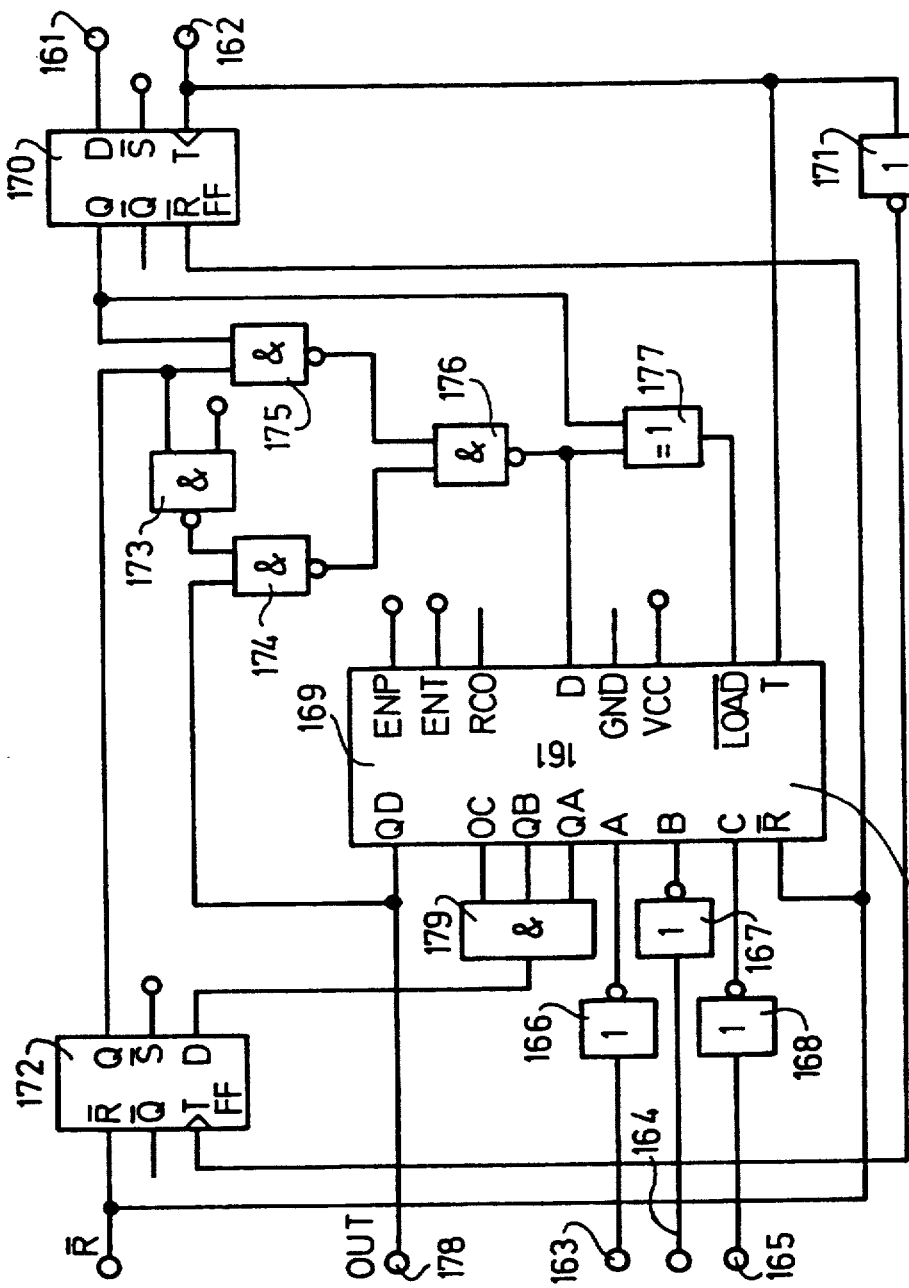
FIG. 6 is a circuit diagram of a digital filter forming part of the system.
Figure 7:
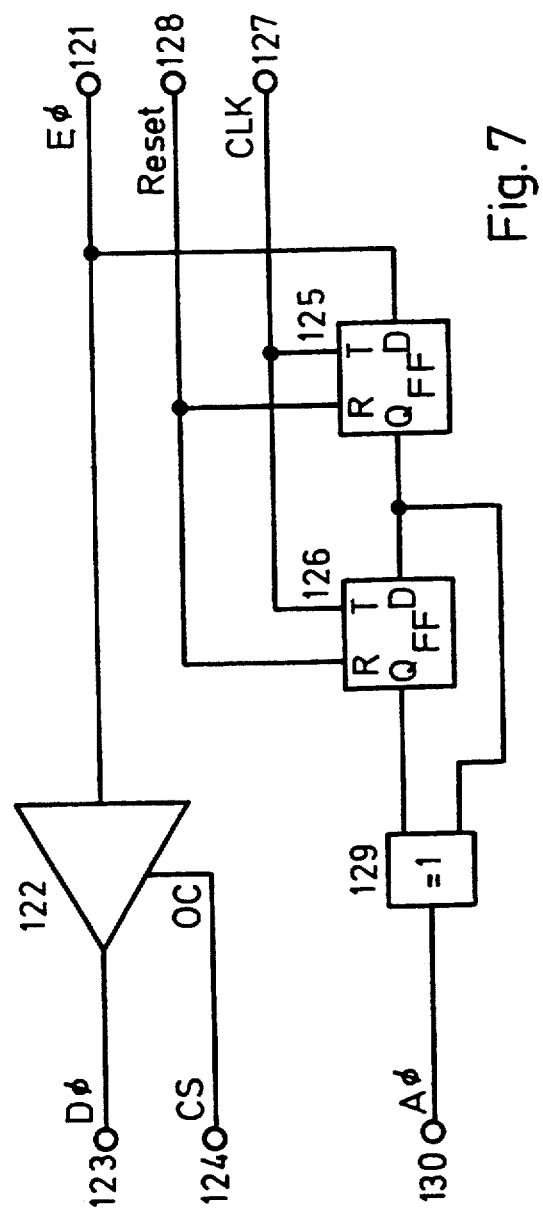
FIG. 7 is a circuit diagram of an input circuit with an interrupt if the input signal changes forming part of the system.
Figure 8:
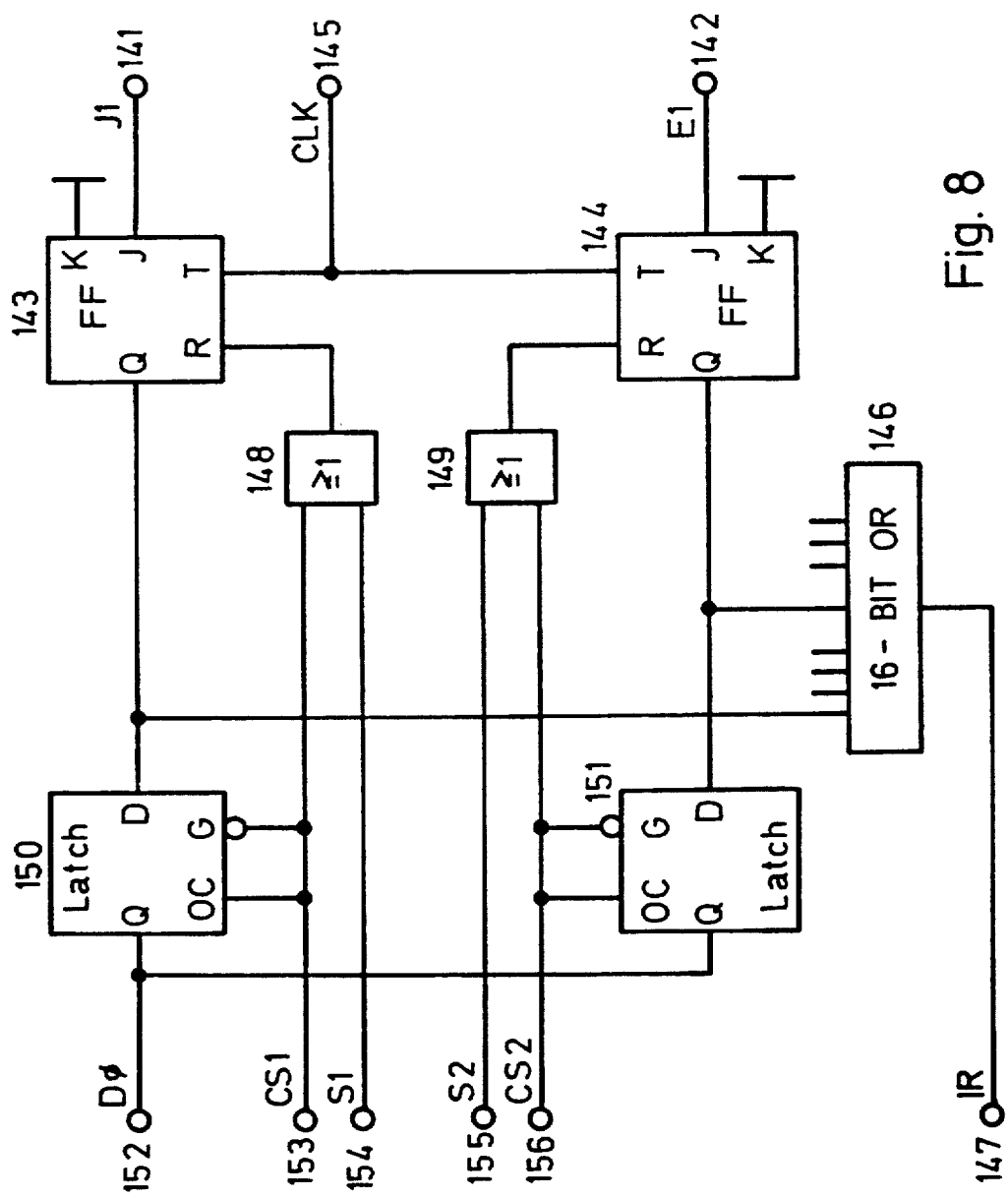
FIG. 8 is a circuit diagram of an interrupt-triggering circuit forming part of the system.

From the adapter circuit 12, eight parallel input signals are sent to the digital filter 13. FIG. 6 shows an embodiment of one of eight filters which are provided in the circuit 13. The filter serves to suppress interference due to contact bounce or chatter and noise pulses on the lines. It further transmits an input signal only if its value does not change during the filtering time.

The signal to be filtered is supplied to the input 161, while the clock signal T is introduced at 162. Supplied to the inputs 163, 164 and 165 from the control-word register 5 (FIG. 1) are signals that characterize the number of clock pulses on which the filtering is based. These signals pass via inverters 166, 167 and 168 to the inputs A, B and C of a counter 169. The inputs and outputs designations refer to a counter of the conventional type shown as 161.

The clock signal supplied at 162 pulses a first flip-flop 170 and the counter 169 and is fed via an inverter 171 to the clock input of a second flip-flop 172. Four NOT-AND circuits 173, 174, 175 and 176 form a multiplexer which, depending upon the instantaneous level of output Q of the flip-flop 172, transmits either the output signal Q of the flip-flop 170 or the output signal QD of the counter 169 to the input D of the counter 169. The output of the multiplexer as well as the output Q of the flip-flop 170 are connected to inputs of an exclusive-OR circuit 177, the output of which is connected to the LOAD input of the counter 169.

With an unchanged signal at the input 161, the signal at the output of the NOT-AND circuit 176 is returned via the multiplexer to the D-input of the counter. Because the input and output signals are equal, the LOAD is actively low. If the signal at the input 161 changes, the signal at the LOAD input becomes high and the counter 169 starts to count. With a predetermined filter number of 3, the counter status is 4. If the input signal returns to its old state before the counter 169 reaches the value 7, LOAD becomes low again and filtering is discontinued.

When the counter reaches its final count 7, the high level is applied via a triple AND circuit 179 to the D-input of the flip-flop 172. At the next negative edge of the clock signal, the output Q of the flip-flop 172 assumes the high level and switches the multiplexer to the Q-output of the flip-flop 170, so that the then current level of the input signal is applied to the D-input of the counter 169. LOAD becomes low again, since there is equality between input and D-input of the counter 169, and connects the input information through to the output 178. At the same time, the D-input of the flip-flop 172 becomes low through the loaded filter number 3. At the next negative edge of the clock signal, the output Q of the flip-flop 172 likewise becomes low and switches the multiplexer, so that once again the output signal of the counter 169 is returned to its D-input.

Eight parallel output signals of the digital filter 13 (FIG. 1) are supplied to the input circuit 4. An embodiment of the input circuit is described hereinafter with reference to FIG. 7, which shows one of the eight channels in the input circuit 4. The output signal of the digital filter 13 (FIG. 1) is supplied at 121 and can be fed via a tristate driver 122 and the output 123 to the data bus 1 (FIG. 1). For this purpose, a seek signal CS is supplied via a control input 124 to the tristate driver 122.

Via an input 127, the system clock CLK (FIG. 7) is applied to the clock inputs of two flip-flops 125 and 126. With the flip-flops 125 and 126, the input signal is delayed, respectively, by one clock period. With the aid of an exclusive OR circuit 129, there is determined whether the input signal has changed from one clock to the next. If this is the case, a signal to trigger an interrupt is sent from the output 130.

Checking the System

As explained hereinbefore in conjunction with the output of signals and peripheral units, the reading-in of the signals that have been output provides a first possibility for checking the input/output system. A further check is performed in that test patterns can be applied to the inputs of the digital filter and in that the thus generated output signals of the input circuit 4 are checked for agreement. This increases safety and reliability when the system according to the invention is used for input. In addition, this allows more accurate pin-pointing of errors when the system according to the invention is used for output.

For connecting-in the test pattern, the control unit 2 (FIG. 1) writes a test pattern into the test-pattern register 7 via the data bus 1, and the test pattern 7 is supplied to the inputs of the digital filter 13. The instant of time at which the test pattern is connected is determined by a control bit in the control-word register 5. The test-pattern register 7 can be implemented in a relatively simple manner with readily obtainable components, so that further explanation is unnecessary. It contains basically an eight-bit register with tristate outputs. It is advantageous for the test pattern to be formed so that a value 1 occurs consecutively in the eight parallel channels, with the other channels being set to zero. Thus, among other things, each of the channels being checked is tested for a connection with a neighboring channel.

Interrupt Triggering

The input circuit 4 and the output-stage circuit 9 each send eight parallel signals, respectively, to the circuit 6 for interrupt triggering. A respective signal from the input circuit 4 passes via an input 141 (FIG. 8) to a J-input of a JK flip-flop 143, into which the signal is loaded with a clock CLK applied at 145. A respective one of the signals supplied from the output-stage circuit 9 (FIG. 1) is sent via an input 142 to a JK flip-flop 144, into which it is likewise loaded with the clock CLK. If a 1 is present at one of the outputs of the 16 flip-flops 143, 144, an interrupt signal is sent to the control unit via the 16-bit OR circuit 146 and the output 147.

In systems with several circuits for triggering an interrupt, the control unit interrogates the individual circuits in turn to find out which input has triggered the interrupt. This is known as polling, in which, for the circuit shown in FIG. 8, the outputs of the flip-flops 143, 144 are interrogated consecutively via registers 150, 151 by the seek pulses CS1 and CS2 supplied at 153 and 156. Outputs of the registers 150 and 151 are each connected to a lead of the data bus via a connection 152. During the reading-out of the registers 150 and 151, the D-inputs thereof are disabled, so that a resetting of the flip-flops 143, 144 does not change the contents of the registers 150, 151.

Via inputs 154 and 155 and OR circuits 148, 149, signals S1 and S2 can be supplied from the control-word register 5 (FIG. 1) to the reset inputs of the flip-flops 143, 144, these signals making it possible to suppress the further-transmission of individual error signals.

Within the scope of the invention, the triggering of an interrupt may also be performed via an interrupt controller, which supplies an interrupt vector to the control unit.

Figure 9:
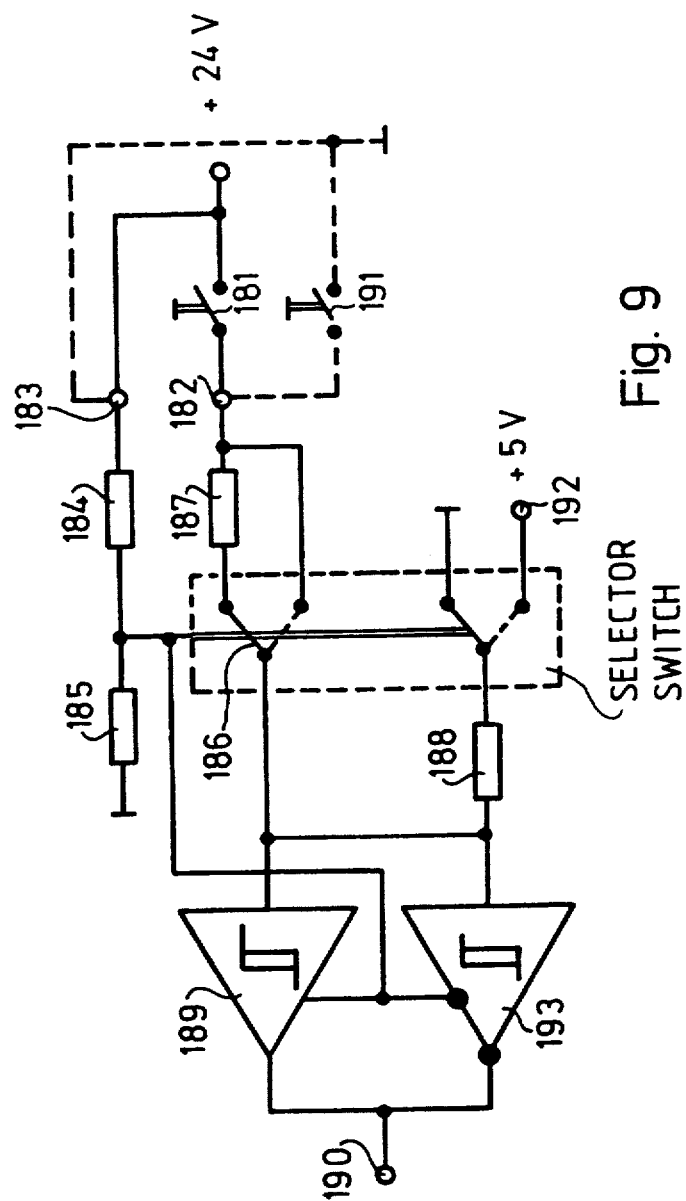
FIG. 9 is a circuit diagram of a third specimen embodiment of an adapter circuit forming part of the system according to the invention.

With the aid of the adapter circuit shown in FIG. 9, the signal of a sensor, for example a switch 181, can be received irrespective of whether the connection of the switch 181 facing away from the input 182 is connected to ground or frame potential or to a reference voltage differing from ground or frame potential. A system according to the invention provided with such an adapter circuit can be used for controlling a machine in which there is, in fact, a mix of both types of connections, for example, when machine complexes of different product lines are connected together, without requiring separate adaption of the circuits and of the program, respectively, to the sensors.

For automatic adaption to the various modes of operation of the sensors, the reference voltage (either) ground or frame potential or a voltage differing from ground or frame potential) is supplied via an input 183 and a voltage divider 184, 185 to the control input of a controllable two-pole selector switch 186. If the reference voltage differs from ground or frame potential, the selector switch is located in the upper position identified by the solid line.

In addition, the output voltage of the voltage divider 184, 185 is supplied to inputs of two threshold-value switches 189 and 193 and, in fact, in negated form to the threshold-value switch 193. This means that the output signal of the threshold-value switch 189 is transmitted farther to the output 190 if there is a positive voltage at the voltage divider 184, 185. The output of the threshold-value switch 193 is then disabled. Preferably, use is made in this connection of a threshold-value switch with a so-called tristate output, which has a high resistivity when there is a corresponding signal at the input. If the voltage at the voltage divider 184, 185 corresponds to ground or frame potential, the output voltage of the threshold-value switch 193 is transmitted farther to the output 190, while the output of the threshold-value switch 189 is disabled or blocked. The threshold-value switches 189 and 193 differ in that the threshold-value switch 189 does not effect any inversion between the input and output signals, whereas an inversion is provided with the threshold-value switch 193.

When the switch 181 connected to +24 V is activated, the positive voltage is supplied via the voltage divider (formed by the resistors 187, 188) to the inputs of the threshold-value switches. Thereupon, the threshold-value switch 189 likewise applies positive potential of, for example, 5 V to the output 190. With the switch 181 open, 0 V is applied to the input of the threshold-value switch 189, so that the output voltage is also 0 V.

If, however, instead of the switch 181, a switch 191 at ground or frame potential is connected to the adapter circuit and, at the same time, the point 183 is likewise connected to ground or frame potential, the selector switch 186 is in the lower position and the threshold-value switch 193 is active. In this case, with the switch 191 open, the voltage of +5 V supplied via the input 192 and the resistor 188 is present at the input of the threshold-value switch 193. The output voltage of the threshold-value switch 193 and thus the voltage at the output 190 is then 0 V. If the switch 191 is closed, ground or frame potential is applied to the input of the threshold-value switch 193, with the result that the output voltage is then 5 V.

Independently of whether the respective switch is connected to ground or frame potential or to a positive operating voltage, the adapter circuit shown in FIG. 9 supplies one logic level when the switch is closed and the other when the switch is opened. Together with a control system, therefore, both types of sensors (switch to ground or frame, switch to positive potential) can be used alternatively or in combination, without requiring a special adaption of the circuits or of the program to the sensors. Interrogation by a program as to whether the sensors are connected to ground or frame or to a positive potential is also unnecessary.

The foregoing is a description corresponding in substance to German Application P 36 42 500.1, dated Dec. 12, 1986, the International priority of which is being claimed for the instant application, and which is hereby made part of this application. Any material discrepancies between the foregoing specification and the aforementioned corresponding German application are to be resolved in favor of the latter.

We claim:

1. The combination comprising a printing machine having a plurality of loads including relays for controlling elements of the printing machine, and indicators for indicating states of the printing machine, and a monitoring system for an electronic digital control system and said loads, the combination including an electronic digital control unit; a plurality of peripheral units; a bus system for interconnecting said monitoring system, said digital control unit and said peripheral units; the monitoring system including an output circuit having inputs connected to said control unit and output registers having register contents; an output stage circuit having inputs connected to said output circuit and to said loads, first outputs having output signals connected to said peripheral units for interrogating for fault conditions of said loads; an interrupt trigger circuit having outputs connected to said control unit, a data line connecting second outputs of said output stage circuit with inputs of said interrupt trigger circuit for triggering an interrupt of said control unit in response to a fault condition of at least one of said peripheral units, a digital filter connected between said monitoring system and said peripheral units for filtering out noise signals from said peripheral units, said combination further including means for interrogating said first outputs of said output stage circuit via addresses other than said address of the register which contains the output.

2. The combination according to claim 1, including other data lines for interrogating said first outputs of said output stage circuit.

3. The combination according to claim 1, including a plurality of output registers comprised in said output circuit, wherein said bus system has a given bit width, and the number of said output registers conform to the bit width of said bus system.

4. The combination according to claim 1, wherein said output stage circuit has outputs, each formed by a transistor having a collector with a load resistance formed by the respective peripheral unit connected to said output.

5. The combination according to claim 1, including a plurality of output stages in said output stage circuit, wherein each of said output stages have an output formed with one transistor and a further transistor serially connected, and transistor drive means coupled to said one and said further transistor for driving at least one of said one and said further transistors into a non-conducting state.

6. The combination according to claim 1, wherein said output stage comprises devices for detecting output current.

7. The combination according to claim 1, including an input circuit having input registers for interrogating said output signals, said input registers having respective inputs and outputs which are connected to said outputs of the output stage circuit and to the bus system respectively.

8. The combination according to claim 7, including adapter circuits connected ahead of said input registers for adapting said output signals to usable signal levels.

9. The combination according to claim 8, including a digital filter connected between said adapter circuits and said input registers.

10. The combination according to claim 7, wherein said output stage circuit has outputs constructed as combined input/output ports, said control unit being programmable to selectively set each of said combined input/output ports as one only of a respective input and output port.

11. The combination according to claim 10, wherein each of said peripheral units, respectively, has two connections, and wherein, respectively, one of said connections is to one of said input/outputs and the other of said connections is to a reference potential, said reference potential being applied as a control for a further input of said adapter circuit.

12. The combination according to claim 11, wherein said output stage circuit has a plurality of the output stages, each having two series-connected transistors, and including means for controlling the respective output stages as a function of said reference potential so that one of said transistors is driven, said driven transistor having a connection having a different voltage than said reference potential.

* * * * *